US011712002B2

(12) United States Patent
Mygind Bojsen (10) Patent No.: US 11,712,002 B2
(45) Date of Patent: Aug. 1, 2023

(54) RESIDUE SPREADER FOR A COMBINE HARVESTER

(71) Applicant: AGCO International GmbH, Neuhausen (CH)

(72) Inventor: Thomas Mygind Bojsen, Randers (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 17/756,289

(22) PCT Filed: Nov. 23, 2020

(86) PCT No.: PCT/EP2020/083058
§ 371 (c)(1),
(2) Date: May 20, 2022

(87) PCT Pub. No.: WO2021/099633
PCT Pub. Date: May 27, 2021

(65) Prior Publication Data
US 2022/0408642 A1 Dec. 29, 2022

(30) Foreign Application Priority Data

Nov. 22, 2019 (GB) ..................................... 1917024
Aug. 5, 2020 (GB) ..................................... 2012140

(51) Int. Cl.
*A01D 41/12* (2006.01)
(52) U.S. Cl.
CPC .............................. *A01D 41/1243* (2013.01)

(58) Field of Classification Search
CPC ........................... A01D 41/1243; A01F 12/40
See application file for complete search history.

(56) References Cited

U.S. PATENT DOCUMENTS

| 4,218,022 A | 8/1980 | Boehm et al. |
| 4,921,469 A | 5/1990 | Scharf |
| 5,569,081 A | 10/1996 | Baumgarten et al. |

(Continued)

FOREIGN PATENT DOCUMENTS

| EP | 1 208 737 A1 | 5/2002 |
| EP | 1342402 A1 | 9/2003 |

(Continued)

OTHER PUBLICATIONS

UK Intellectual Property Office, Search report for priority UK Application No. GB1917024.0, dated May 18, 2020.

(Continued)

*Primary Examiner* — Alicia Torres (57) ABSTRACT

A residue spreader for receiving crop residue from a residue chopper of a combine harvester and spreading crop residue onto the ground. The spreader includes a body having an inlet side and an outlet side, a plurality of outlet deflectors, each outlet deflector mounted on the body in juxtaposed position and configured to laterally deflect the crop residue between the inlet side and the outlet side, and a plurality of inlet deflectors, each inlet deflector pivotally mounted on the body in juxtaposed position and extending forwards from a respective pivot axis towards the inlet side and each configured to laterally deflect the crop residue between the inlet side and the outlet side upstream of the outlet deflectors.

19 Claims, 8 Drawing Sheets

(56) References Cited

U.S. PATENT DOCUMENTS

| | | |
|---|---|---|
| 6,783,454 B2 | 8/2004 | Bueermann |
| 6,908,379 B2 | 6/2005 | Gryspeerdt et al. |
| 6,939,221 B1 | 9/2005 | Redekop et al. |
| 7,331,855 B2 | 2/2008 | Johnson et al. |
| 8,010,262 B2 | 8/2011 | Schroeder et al. |
| 10,362,732 B2 | 7/2019 | Baumgarten et al. |
| 2002/0072400 A1 | 6/2002 | Foth |
| 2005/0003876 A1 | 1/2005 | Kuehn |
| 2008/0268927 A1 | 10/2008 | Farley et al. |
| 2011/0093169 A1 | 4/2011 | Schroeder et al. |
| 2015/0264864 A1 * | 9/2015 | Branch .............. A01D 41/1243 701/50 |
| 2016/0192587 A1 | 7/2016 | Ballegeer et al. |

FOREIGN PATENT DOCUMENTS

| | | | |
|---|---|---|---|
| EP | 1856966 A1 * | 11/2007 | ......... A01D 41/1243 |
| EP | 2 225 929 A1 | 9/2010 | |
| EP | 2384610 A1 | 11/2011 | |
| EP | 2934083 A1 * | 10/2015 | ......... A01D 41/1243 |
| ES | 2001571 A6 | 3/1991 | |
| WO | 03/039238 A1 | 5/2003 | |

OTHER PUBLICATIONS

European Patent Office, International Search Report related to International Patent Application No. PCT/EP2020/083058, dated Feb. 23, 2021.

UK Intellectual Property Office, Search report for priority UK Application No. GB2012140.6, dated Jan. 27, 2021.

\* cited by examiner

RESIDUE SPREADER FOR A COMBINE HARVESTER

CROSS-REFERENCE TO RELATED APPLICATION

The present application claims the benefit of and priority from United Kingdom Application Nos. 1917024.0, filed Nov. 22, 2019, and 2012140.6, filed Aug. 5, 2020, the entire disclosures of which are hereby incorporated by reference.

FIELD OF INVENTION

The present invention relates to agricultural harvesters such as combines, and, more particularly, to residue spreaders for receiving crop residue from a residue chopper and for spreading chopped crop residue onto the ground.

BACKGROUND OF INVENTION

For many decades, self-propelled combine harvesters have been used by farmers to harvest a wide range of crops including cereals, maize and oil-seed rape. Typically, a combine harvester cuts the crop material, threshes the grain (or seed) therefrom, separates the grain from the crop residue, and cleans the grain before storing in an on-board tank. The crop residue, often referred as MOG (Material Other than Grain), is ejected from the rear of the machine. Depending upon the crop being harvested, the crop residue is usually predominantly straw and referenced as such hereinafter. However, it should be appreciated that references to straw used herein will include any residue crop material discharged by the processor of a combine harvester.

Depending on the requirements of the farmer, the straw is either deposited directly onto the ground in windrows for subsequent baling and removal, or chopped and spread onto the field behind the combine for incorporation back into the soil. Straw choppers are typically fitted at the rear of the combine for chopping the straw ejected from the separating apparatus. The straw choppers are often mounted in a way to allow them to pivot away from path of the discharged straw when not required. Straw spreaders are often provided behind the chopper to receive the chopped straw from the chopper and spread the chopped straw onto the ground.

Several different types of straw spreaders are known. In their simplest form a 'passive' tailboard located immediately behind the straw chopper and provided with directional guide vanes relies upon the momentum of the chopped residue propelled from the straw chopper to spread the material over a spread width. U.S. Pat. No. 6,939,221 discloses an example of a tailboard with deflectors. In another example WO-03/039238 discloses a spreader having adjustable spreader wings.

It is also known to provide 'active' straw spreaders which have rotating impellors, usually two, the impellors imparting a propulsive force to the chopped material to achieve a greater spread width than can normally be achieved with passive spreaders. U.S. Pat. No. 7,331,855 discloses an example of a straw spreader with two counter-rotating impellors.

In addition to achieving a satisfactory spread width, it is also desirable to spread the crop residue evenly across the ground to achieve an even distribution of nutrients provided by the residue, to avoid issues with subsequent tillage operations and to promote even establishment of the next crop. Variables such as the field's terrain, cutting height and wind direction can affect the final placement of the crop residue and, thus, the evenness of distribution.

Current methods to adjust the spread width and pattern include the adjustment of individual deflector plates, changing the angle of the tailboard and/or adjusting the speed of impellors. For example, WO03/039238 discloses directional vanes, the angle of which is adjusted by an actuator.

A particular problem occurs when a combine harvester is working across a sloped terrain, with one of the left- and right-hand sides of the machine higher than the other. Gravity acts to push the separated straw within the combine to one side or the other before it reaches the chopper, which has an adverse impact on the evenness of feed to the chopper and, ultimately, upon the resultant spread pattern. Whilst known straw spreaders can improve the evenness of spread pattern to some extent, known spreader often cannot overcome the negative effects of uneven feed to the chopper, especially in sidehill conditions.

The problem of uneven feeding to the chopper is addressed in part by U.S. Pat. No. 6,783,454 which discloses an adjustable straw guide located between separating apparatus and a discharge assembly. Pivoting movement of the straw guide is controlled to improve the evenness of feeding to the chopper. However, the straw guide is cumbersome and difficult to incorporate into the area above the chopper. There remains a need to overcome uneven spread patterns caused by uneven feed to the chopper.

SUMMARY OF INVENTION

In accordance with one aspect of the invention there is provided a residue spreader for receiving crop residue from a residue chopper of a combine harvester and for spreading crop residue onto the ground. The spreader comprises a body having an inlet side and an outlet side, and a plurality of outlet deflectors, each outlet deflector being mounted on said body in juxtaposed position and configured to laterally deflect the crop residue between the inlet side and the outlet side. A plurality of inlet deflectors are provided, each inlet deflector being pivotally mounted on said body in juxtaposed position and extending forwards from a respective pivot axis towards said inlet side and each being configured to laterally deflect the crop residue between the inlet side and the outlet side upstream of the outlet deflectors.

The advantage of the present invention is delivered by the ability of the spreader to permit the controlled lateral distribution of the chopped material entering the spreader by the inlet deflectors prior to adjustment of the spreading width of chopped material over the ground and/or compensation for side winds by adjusting the first (outlet) set of deflector plates.

The provision of pivotable inlet deflectors on the body of a residue spreader allows for the feed of crop residue to the outlet deflectors on the spreader to be adjusted to counter an uneven material flow ejected by an upstream straw chopper. If, for example, axial flow rotors of grain separating apparatus deliver a wide material stream into a chopper, the inlet deflectors can be adjusted accordingly to direct the crop residue towards the centre of the spreader to ensure even residue over the full width. Alternatively, if the separating rotors drop a narrow material stream, under low throughput conditions for example, into the chopper, the inlet deflectors can be adjusted accordingly to direct crop residue material laterally outwards, towards the sides of the spreader.

The position of the inlet deflectors may be manually adjustable with appropriate means to fasten them in a desired position. However, in a preferred embodiment the residue spreader further comprises an inlet deflector control actuator coupled to the plurality of inlet deflectors to operably adjust the inlet deflectors. The inlet deflectors, or respective groups of the inlet deflectors, are preferably coupled together away from their respective pivot axes so that multiple inlet deflectors are adjusted together with a fixed or proportional positional relationship. The inlet deflector control actuator may be a linear or a rotary actuator and may be one of an electric actuator, a hydraulic cylinder or a pneumatic cylinder by way of example.

In one preferred embodiment the outlet deflectors are also pivotally mounted on said body. Each outlet deflector preferably extends rearwards from a respective pivot axis leaving a free end rearward of the respective pivot axis to swing left and right within an adjustment range. The position of the outlet deflectors may be adjusted together or in groups to adjust spread width, side offset or distribution pattern. In some embodiments, an outlet deflector control actuator is provided and coupled to the plurality of outlet deflectors to operably adjust the outlet deflectors.

In one embodiment the spreader may comprise the same number of inlet deflectors and outlet deflectors. The respective pivotal mountings of each of the inlet deflectors are suitably aligned with pivotal mountings of the outlet deflectors in a direction between the inlet side and the outlet side (in the fore and aft direction of the machine to which the spreader is to be attached).

In one preferred embodiment, the components of a first adjusting mechanism associated with the inlet deflectors are identical to the components of the second adjusting mechanism associated with the outlet deflectors to reduce the number of different components on the spreader. As illustrated particularly in FIG. 9 of the exemplary embodiment discussed below, the first and second adjusting mechanisms may be mounted to the body in a back-to-back arrangement, with one mechanism rotated by 180 degrees with respect to the other.

The body is preferably generally planar and may take the form of a tailboard.

Each of the outlet deflectors preferably extends substantially vertically downwards and has a generally curved profile in a plane parallel to the body. Each of the inlet deflectors may extend substantially vertically downwards and have a generally planar profile in a plane perpendicular to the body.

The deflectors of at least one of the pluralities of inlet and outlet deflectors may be divided into at least two groups, wherein each group has a cross bar which is pivotably connected to a linkage mechanism attached to one of the deflector plates in said group, and wherein a pivot arm is pivotably connected at one end to the cross bar and pivotably connected at the other end to an actuator which operably moves said end in a lateral direction to the tailboard.

The deflectors of one or both of the pluralities of inlet and outlet deflectors may be controlled either simultaneously or independently of one another to allow for more or less crop residue to be dispersed to the left or right side as required thereby ensuring a more even distribution of crop residue over the ground.

With the inlet and/or outlet deflectors divided into at least two groups, it is possible to adjust the deflector plates independently with regards to the required width and spreading pattern and side wind compensation. In a preferred embodiment, the deflectors are divided into a left-hand group and a right-hand group, each group comprising at least two deflectors, preferably at least three or more deflectors.

The deflectors are preferably in the form of deflector plates and made from plastic, or sheet metal or the like, and the, or each, actuator may be a hydraulic or pneumatic cylinder or an electromechanical servo unit.

Whilst the invention lends itself well to a passive residue spreader, impellors may be provided to achieve wider spreads for applications with wider headers for example. In one embodiment a pair of impellors are journaled to the body on respective upright rotation axes and positioned outboard of the inlet deflectors. In this case, the impellors engage residue material that is incident on the outboard portions of the inlet side. Outermost ones of the inlet deflectors and outlet deflectors may be configured to channel or deflect residue material accelerated by the impellors.

Aspects of the invention may be embodied in a residue spreading system which includes a controller configured to control pivoting movement of the inlet deflectors. The controller may be an electronic controller with programmable logic for example. In one embodiment movement of the inlet deflectors is controlled in dependence upon a sensed feeding state in association with the crop stream entering or exiting a chopper upstream of the spreader.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Relative terms such as forward, rearward, transverse, lateral, longitudinal and sideways will be made with reference to the normal forward direction of travel of the combine 10 and indicated by arrow F represented in FIG. 1. The terms vertical and horizontal will be made with reference to the level ground 101 upon which the combine 10 is disposed. In other words the Cartesian axes of 'longitudinal', 'transverse', and 'vertical' are made in relation to the frame 12 of combine 10 and are not affected by any slope in the ground. The terms "upstream" and "downstream" are made with reference of the general direction of crop flow along the material conveyance systems described.

Figure 1:
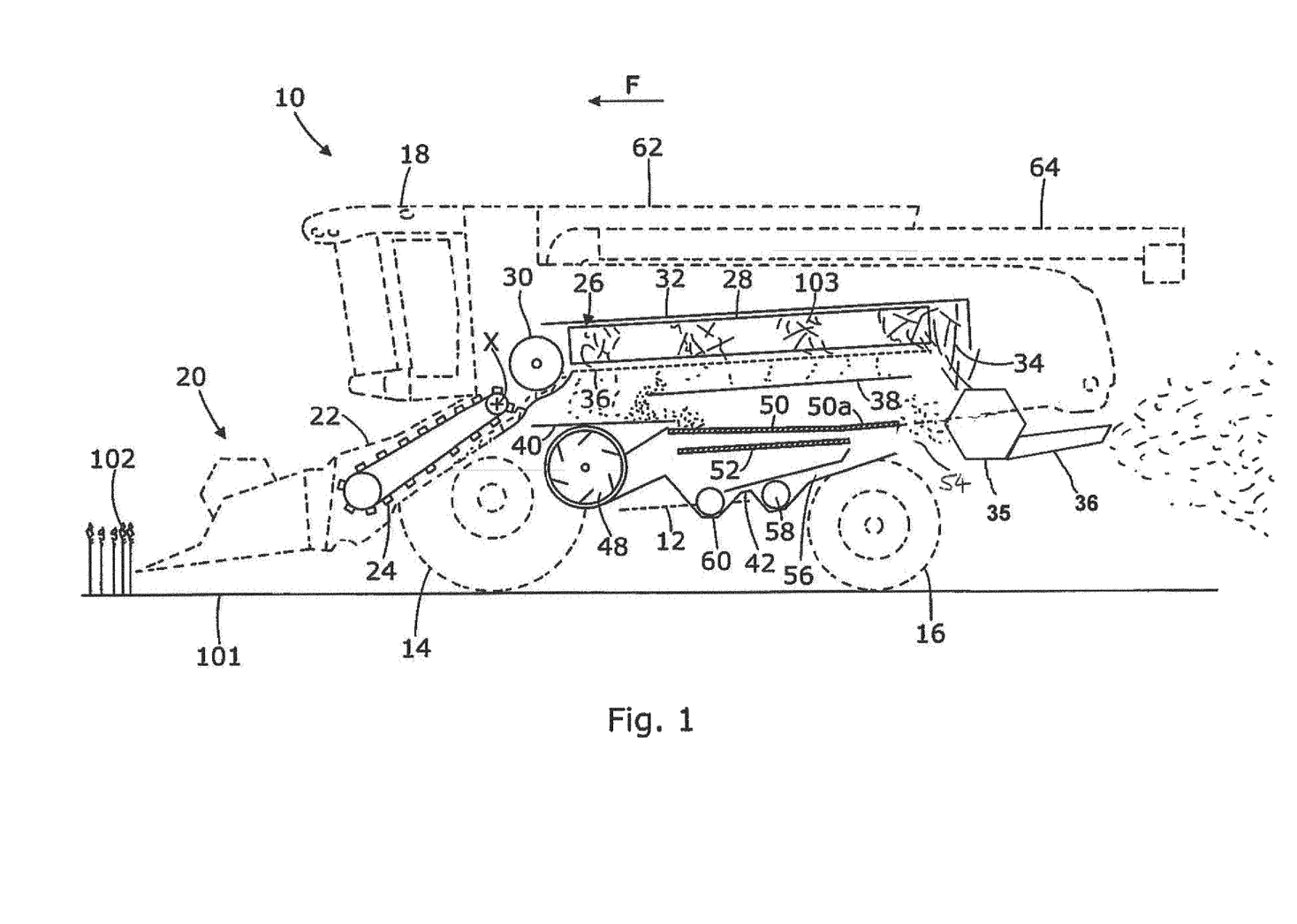
FIG. 1 shows a schematic side view of a known combine harvester comprising a residue spreader positioned after or downstream of a straw chopper.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feeder house 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feeder house 22. An elevator 24, normally in the form of a chain and slat conveyor or elevator as shown, is housed within the feeder house 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

Turning back to FIG. 1, the feed beater 30 rotates on a transverse axis and comprises crop engaging deflectors (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

The axial flow rotors 28 serve to thresh the crop stream in a front region, separate the grain therefrom in a rear region, and eject the straw residue via a straw discharge chute 34 provided below a rear portion of the rotors 28, the straw falling either directly onto the ground in a windrow, or via a straw chopper 35 and straw spreader 36 to be described in more detail later.

A part-cylindrical grate 36 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 36 is typically a mix of grain and material other than grain (MOG) which may include chaff, tailings and some straw.

The return pan 38 and stratification pan 40 together serve as a material conveyance system arranged to convey the separated crop material to a grain cleaning shoe designated generally at 42. The pans 38, 40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge 44 from where the material falls or cascades onto the stratification pan 40. The material on the stratification pan 40 is conveyed rearwardly to a rear discharge edge 46 from where the material falls into the cleaning system or "shoe" 42.

The grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material (mostly chaff) passes to the end of the chaffer and out of the rear of the machine at shoe outlet 54. A rear section of chaffer 50*a* is commonly independently adjustable and is configurable to allow tailings to pass there through into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling there through is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

Figure 2:
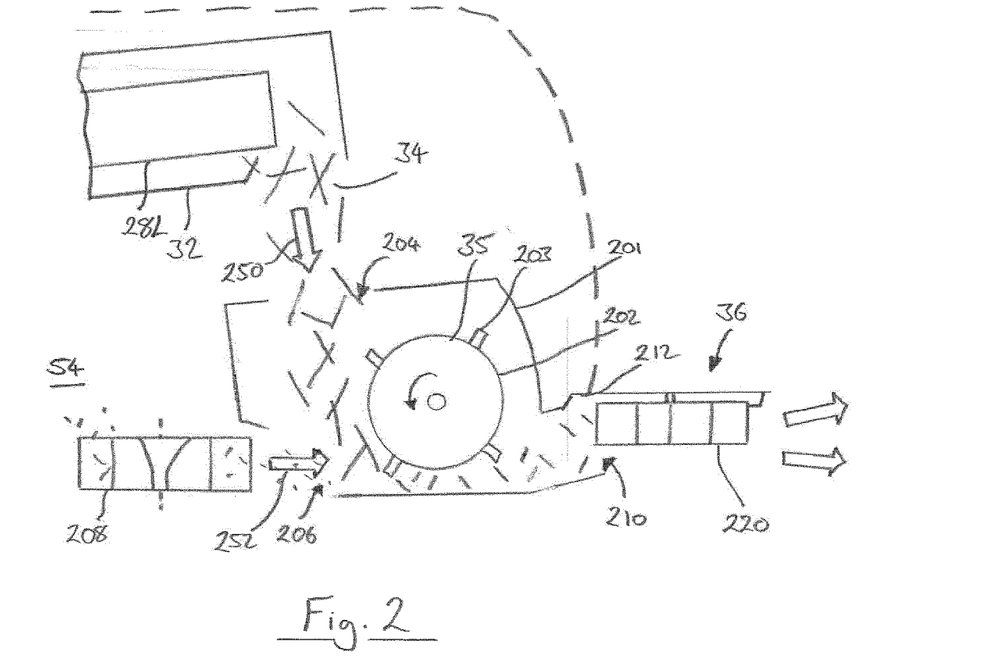
FIG. 2 shows an enlarged schematic side view of a residue handling system located at the rear of a combine harvester in accordance with an embodiment.

Aspects of the invention relate to the handling of the crop residue ejected by the straw chopper 35 and in particular to the straw spreader 36. FIG. 2 shows the passage of straw dropped by the processing rotors 28 and of the chaff from the shoe outlet 54.

The straw chopper 35 has a housing 201 inside which a chopper drum 202 is journaled for rotation on a transverse axis. The chopper drum 202 has sets of knives 203 pivotally mounted to the circumferential surface, the knives 203 interacting with stationary knives (not shown) to chop the material. An upper part of the housing 201 is formed with a first inlet 204 for reception of threshed crop residue (usually and mostly straw) falling from the rear of crop processing rotors 28L, 28R, indicated by arrow 250. Whilst it should be appreciated that only the left-hand rotor 28L can be seen in FIG. 2, both rotors 28L, 28R can be viewed from above in FIG. 3.

A front region of the housing 201 is optionally provided with a second inlet 206 for reception of chaff either directly from the shoe outlet 54 or via a chaff spreader 208 as is known in the art, for example as disclosed in U.S. Pat. No. 6,908,379. The movement of chaff from chaff spreader 208 through the second inlet 206 is indicated by arrow 252.

The residue entering the housing 201 is conveyed tangentially around and under the chopper drum 202, is chopped by the knives 203, and is expelled through an elongate transverse outlet 210 provided in a rear lower region of the housing 201.

A straw spreader 36 is pivotally mounted on the rear part of the combine 10 by being connected proximate to the chopper outlet 210 at a pivot mount 212. The spreader 36 serves to spread the chopped material discharged from the chopper 35 via the outlet 210 on to the ground 101.

Figure 3:
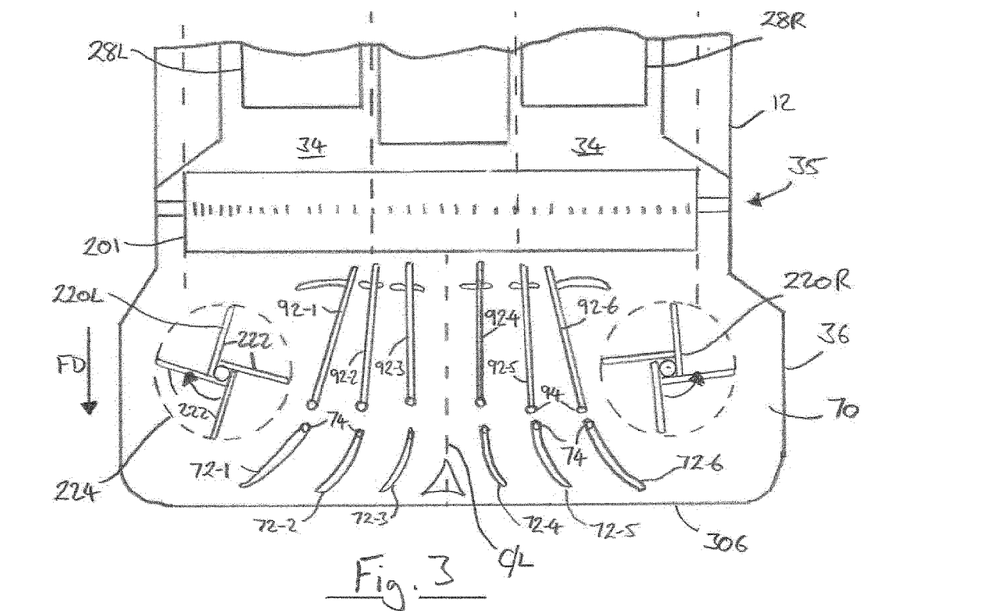
FIG. 3 is a schematic plan view of the residue handling system of FIG. 2, cutaway to reveal the working components.
Figure 4:
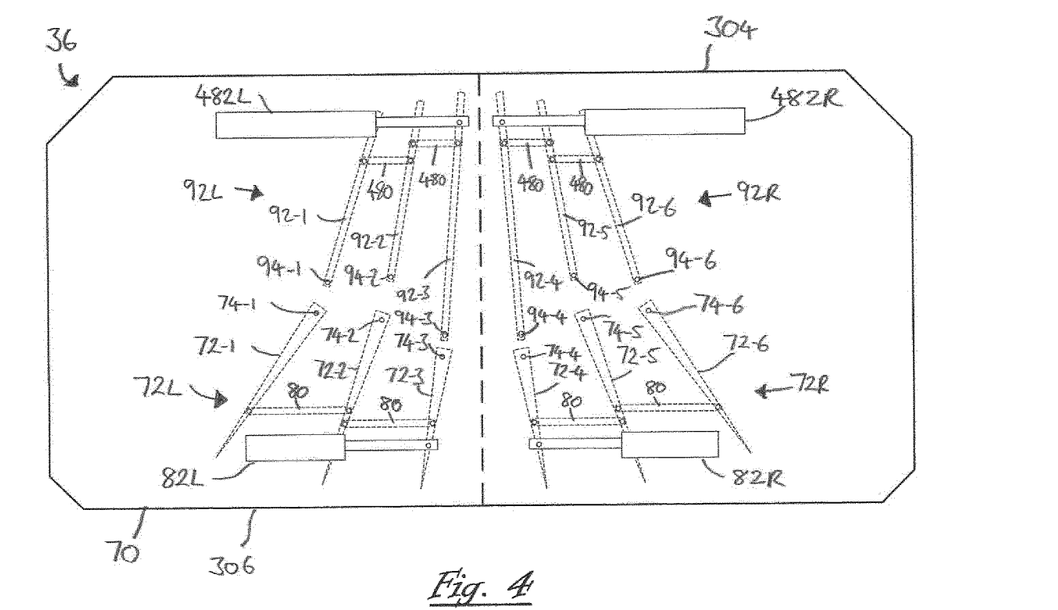
FIG. 4 is a schematic plan view of a residue spreader in accordance with an embodiment showing the control actuators and linkages in association with inlet deflectors and outlet deflectors.

With reference to FIGS. 3 and 4, the straw spreader or tailboard 36 comprises a generally planar body in the form of a base plate 70. The base plate 70 has an inlet side 304 and an outlet side 306. The inlet side 304 extends transversely along a front edge of the tailboard 76 contiguous or adjacent an upper edge of the chopper outlet 210. The outlet side 306 extends transversely along a rear edge of the tailboard 76. Chopped crop residue exiting through the chopper outlet 210 is thrown up against the underside of the base plate 70 and directed in a generally rearward direction of flow (indicated by arrow FD) from the inlet side 304 to the outlet side 306.

The spreader 36 comprises two sets of deflectors in the form of deflector plates mounted on the underside of the base plate 70 and shaped and arranged so that chopped material exiting from the outlet 210 impacts the deflector plates causing a lateral change in direction of the material.

Firstly, a set of six outlet (or output) deflectors 72 (labelled in FIGS. 3 and 4 as 72-1 to 72-6), are provided, each outlet deflector 72 being pivotally mounted on the underside of the base plate 70 in juxtaposed position and configured to laterally deflect the crop residue between the inlet side 304 and the outlet side 306. The outlet deflectors 72 are pivotally connected to the base plate 70 at respective pivoting connections 74 in a juxtaposed relationship. Each outlet deflector 72 extends generally rearwards, or in the direction of crop conveyance, from the respective pivot axis 74 towards the outlet side 306).

Each outlet deflector 72 extends generally perpendicularly to the plane of the base plate 70 with a curved (FIG. 3) or straight (FIG. 4) cross-sectional profile within that plane. Each outlet deflector 72 protrudes generally downwards to present a deflecting surface which engages the residue material passing along the underside of the base plate 70. As shown in FIG. 3, the curved profile of the output deflector plates 72 changes to the left and right of the set such as to divert the cut material away from the centreline of the spreader (represented by C/L) which aligns with the centreline of the combine harvester 10.

The outlet deflectors 72 are preferably made from plastic, or sheet metal or the like.

The six outlet deflectors 72 are divided into a left-hand group 72L of three outlet deflectors 72-1, 72-2, 72-3, and a right-hand group 72R of three outlet deflectors 72-4, 72-5, 72-6. The deflectors 72 within each group of outlet deflectors 72L, 72R are coupled together so that they move in unison. As illustrated schematically in FIG. 4, adjacent pairs of outlet deflectors 72 are joined by respective link arms 80, connected to the respective pair of outlet deflectors 72 away from the associated pivot axes 74 of those outlet deflectors 72. Whilst the link arms 80 are shown schematically in FIG. 4 as being connected to neighbouring pairs of outlet deflectors 72 on the underside of the base plate, it should be understood that the link arms 80 must be connected in a practical manner so as not to inhibit the flow of residue material through the spreader. In another embodiment shown in FIG. 9, the link arms 80 are connected to crank arms 76 which extend away from the pivot connections 74 in the opposite direction to the outlet deflector 72.

Turning back to FIG. 4, each group of outlet deflectors 72L, 72R has coupled thereto an actuator 82L, 82R which is mounted to the upper side of the base plate 70 and connected to one of the outlet deflectors 72 in the group (the innermost deflectors 72-3, 72-4 in the example of FIG. 4) through a preferably arcuate slot provided in the base plate 70. Left and right pivoting of the groups of deflectors 72L, 72R is controlled by the actuators 82L, 82R.

Although illustrated and described as having six outlet deflectors 72 in two groups of three deflectors, it should be appreciated that more or less than six deflectors can be provided.

In an alternative embodiment the outlet deflectors 72 are fixedly mounted to the base plate 70 with no freedom to pivot and with no need for actuators 82.

Secondly, with reference again to FIGS. 3 and 4, a set of six inlet (or input) deflectors 92 (labelled in FIGS. 3 and 4 as 92-1 to 92-6), are provided, each inlet deflector 92 being pivotally mounted on the underside of the base plate 70 in juxtaposed position and configured to laterally deflect the crop residue between the inlet side 304 and the outlet deflectors 72. The inlet deflectors 92 are pivotally connected to the base plate 70 at respective pivoting connections 94 in a juxtaposed relationship. Each inlet deflector 92 extends generally forwards, or counter to the direction of crop conveyance, from the respective pivot axis 94 towards the inlet side 304.

Each inlet deflector 92 extends generally perpendicularly to the plane of the base plate 70 with a preferably straight cross-sectional profile within that plane. Each outlet deflector 92 protrudes generally downwards to present a deflecting surface which engages the residue material passing along the underside of the base plate 70.

The inlet deflectors 92 are preferably made from plastic, or sheet metal or the like.

The six inlet deflectors 92 are divided into a left-hand group 92L of three inlet deflectors 92-1, 92-2, 92-3, and a right-hand group 92R of three inlet deflectors 92-4, 92-5, 92-6. The deflectors 92 within each group of inlet deflectors 92L, 92R are coupled together so that they move in unison. As illustrated schematically in FIG. 4, adjacent pairs of inlet deflectors 92 are joined by respective link arms 480, connected to the respective pair of inlet deflectors 92 away from the associated pivot axes 94 of those outlet deflectors 92. Whilst the link arms 480 are shown schematically in FIG. 4 as being connected to neighbouring pairs of inlet deflectors 92 on the underside of the base plate, it should be understood that the link arms 480 must be connected in a practical manner so as not to inhibit the flow of residue material through the spreader. In another embodiment shown in FIG. 9, the link arms 480 are connected to crank arms 476 which extend away from the pivot connections 94 in the opposite direction to the inlet deflector 92.

Turning back to FIG. 4, each group of inlet deflectors 92L, 92R has coupled thereto an actuator 482L, 482R which is mounted to the upper side of the base plate 70 and connected to one of the inlet deflectors 92 in the group (the innermost deflectors 92-3, 92-4 in the example of FIG. 4) through a preferably arcuate slot provided in the base plate 70. Left and right pivoting of the groups of deflectors 92L, 92R is controlled by the actuators 482L, 482R.

With reference to FIGS. 2 and 3, the straw spreader 36 may optionally include impellors 220 journaled to the underside of the base plate 70. In the preferred arrangement shown, two impellors 220L, 220R are each journaled to the underside of the base plate 70 on respective upright rotation axes and positioned outboard of the inlet deflectors 92. The impellors 220 each comprise a plurality of impellor blades 222 which rotate to define a cylindrical swept envelope 224.

The impellors 220 are operable to engage residue material ejected from the outboard regions of chopper outlet 210 and incident upon the outboard regions of inlet side 304. The engaged material is propelled generally rearwardly by the impellors 220 and is steered of guided laterally by the outermost inlet deflectors 91-1, 92-6, and the outermost outlet deflectors 72-1, 72-6.

Although illustrated and described as having six inlet deflectors 92 in two groups of three deflectors, it should be appreciated that more or less than six deflectors can be provided.

In an alternative embodiment the actuators 482 are omitted and the inlet deflectors 92 are adjusted manually and held in position by appropriate fastening means such as threaded bolts that pass through arcuate slots in the base plate 70, and nuts that grip the base plate 70. Even with manual adjustment, the inlet deflectors 92 may be coupled together with link arms in one or more groups to assist the manual adjustment.

In another alternative embodiment, the inlet deflectors 92 are all coupled together for pivoting movement in unison, and a single actuator is provided to adjust the position of all inlet deflectors together. In one configuration of link arms, a linear action from the actuator may cause all inlet deflectors to move in the same direction. In another configuration of link arms, a linear action from the actuator may cause two groups of inlet deflectors to move in opposing directions so as to adjust the width of the residue material stream.

Figure 5:
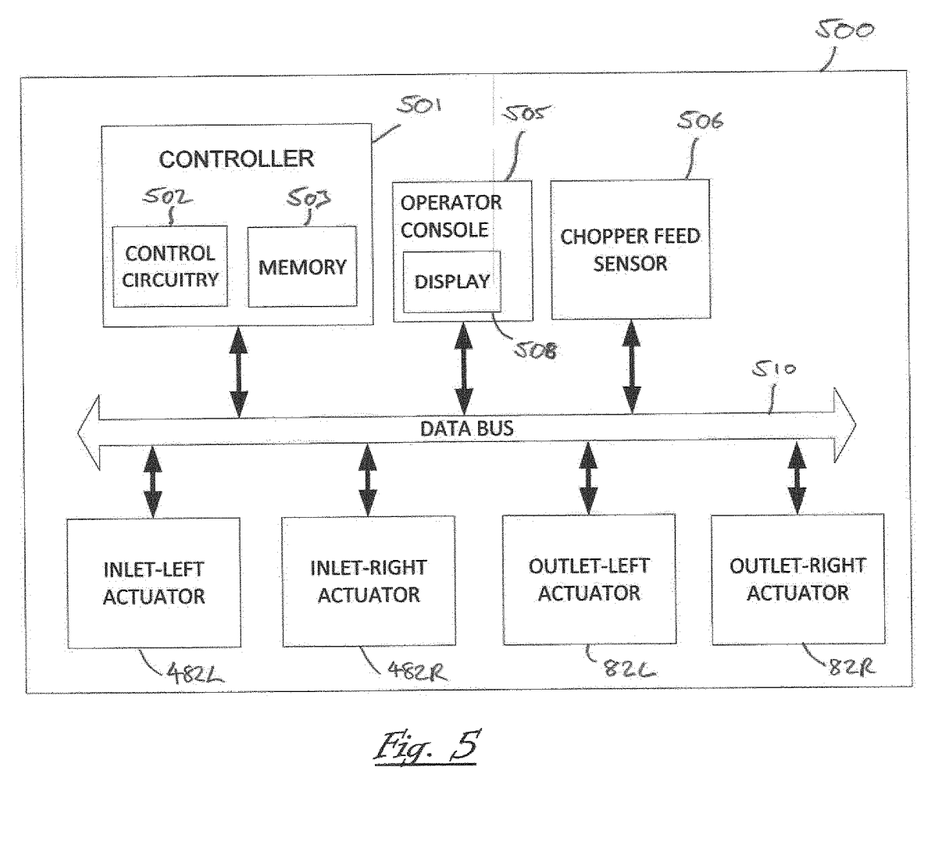
FIG. 5 is a block diagram of a residue spreading system in accordance with an embodiment.

With reference to FIG. 5, a residue spreading system 500 comprises an electronic control unit (hereinafter termed 'ECU') 501 which is in communication (via a data bus 510 for example) with an operator console 505, a chopper feed sensor 506, and the control actuators 82, 482 connected to the outlet and inlet deflectors 72, 92. The ECU 501 comprise control circuitry 502 which may be embodied as custom made or commercially available processor, a central processing unit or an auxiliary processor among several processors, a semi-conductor based micro-processor (in the form of a micro-chip), a macro processor, one or more applications specific integrated circuits, a plurality of suitably configured digital logic gates, and/or other well-known electrical configurations comprising discrete elements both individually and in various combinations to coordinate the overall operation of the combine 10.

The ECU 501 further comprises memory 503. The memory 503 may include any one of a combination of volatile memory elements and non-volatile memory elements. The memory 503 may store a native operating system, one or more native applications, emulation systems, emulated applications for any of a variety of operating systems and/or emulated hardware platforms, emulated operating systems etc. The memory 503 may be separate from the controller 501 or may be omitted.

The operator console 505 comprises a display 508 which may be integrated as part of a terminal having user interface devices such as buttons, levers and switches. The console 505 is mounted proximate to a drivers work station in cab 18.

The chopper feed sensor 506 may be located upstream of the chopper 35, for example in the vicinity of the straw discharge chute 34, and configured to generate electrical signals that are representative of the feeding state of the chopper 35. For example, the feed sensor 506 may indicate wide, narrow or offset feeding of the residue material to the chopper 35.

In one embodiment the ECU 501 is configured to control movement of the inlet deflectors 92, and optionally the outlet deflectors 72, in dependence upon signals received from the feed sensor 506 or other sensed parameter that is indicative of the feeding state of the residue upstream of the chopper 35 or the spreader 36.

The inlet deflectors 92 serve to counter variations in the feeding of residue material to the chopper 35, in particular the material discharged by the processing rotor or rotors 28. In low throughput conditions, for example caused by a thin crop, a narrow swath, and/or a slow groundspeed, a low flow rate of MOG is typically expelled by the rotors 28. In high throughput conditions, for example caused by a dense crop, a full-width swath, and/or a high groundspeed, a high flow rate of MOG is typically expelled by the rotors 28.

Figure 6A:
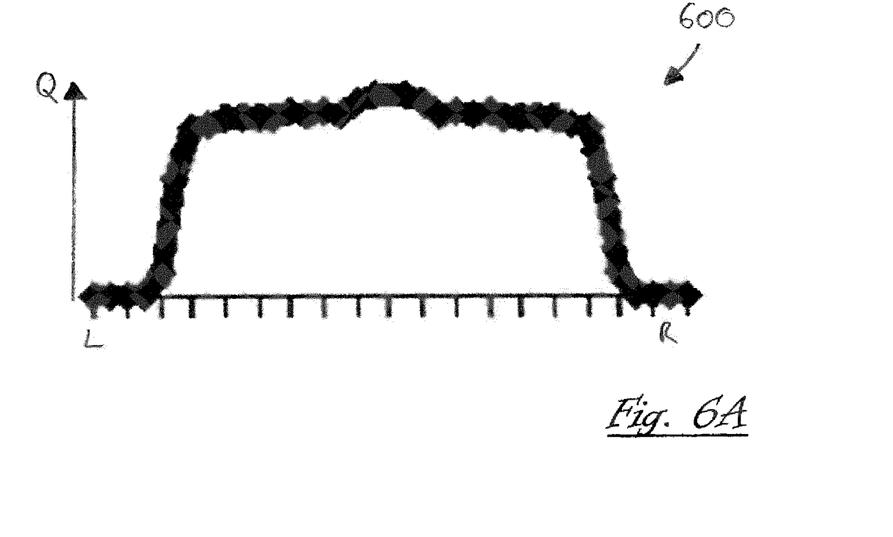
FIG. 6A shows a schematic representation of a feeding load across the width of a chopper in a low MOG harvesting condition.
Figure 6B:
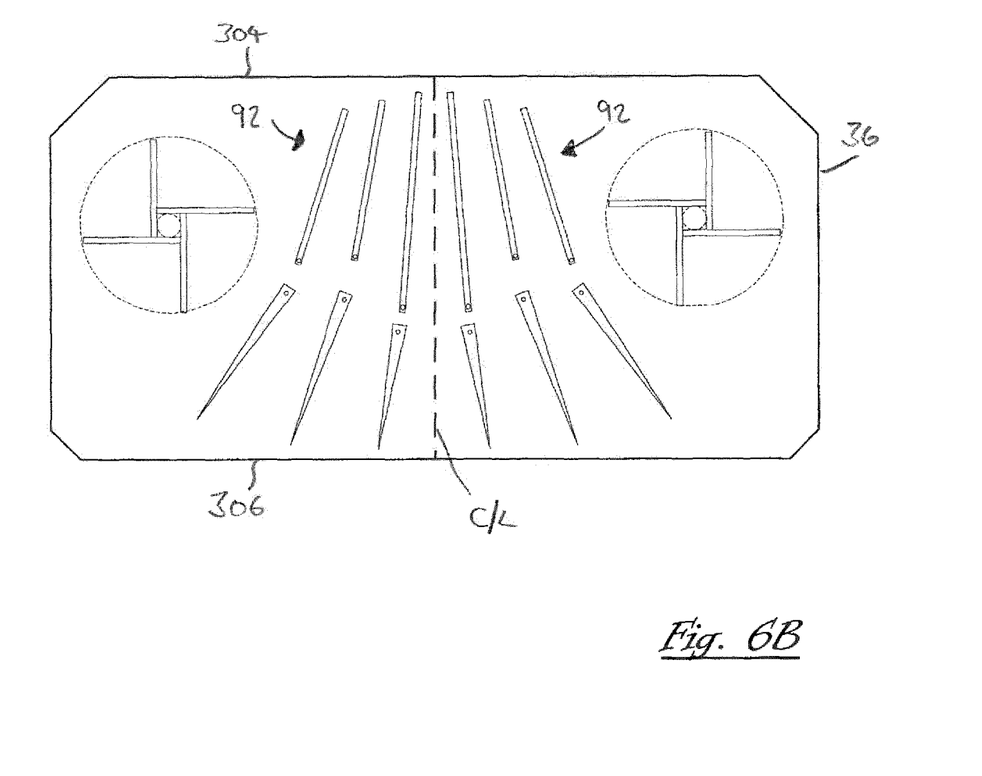
FIG. 6B shows a schematic plan view of the residue spreader of FIG. 4, showing as example positioning of the inlet deflectors in the low MOG harvesting condition.

FIG. 6A illustrates a plot 600 of the rate of residue material 'Q' discharged by the rotors 28 across the width of the discharge chute 34 in a low MOG harvesting condition. As can be seen, in a low MOG harvesting condition, the material 'bunches' towards the centre, away from the outboard regions. In known machines, this leads to an uneven spread pattern behind the combine. When a low MOG harvesting condition is detected the inlet deflectors 92 are, in one embodiment of the invention, positioned so as to steer residue material outwardly away from the centre line (C/L) as illustrated in FIG. 6B thus improving the evenness of the spread pattern.

Figure 7A:
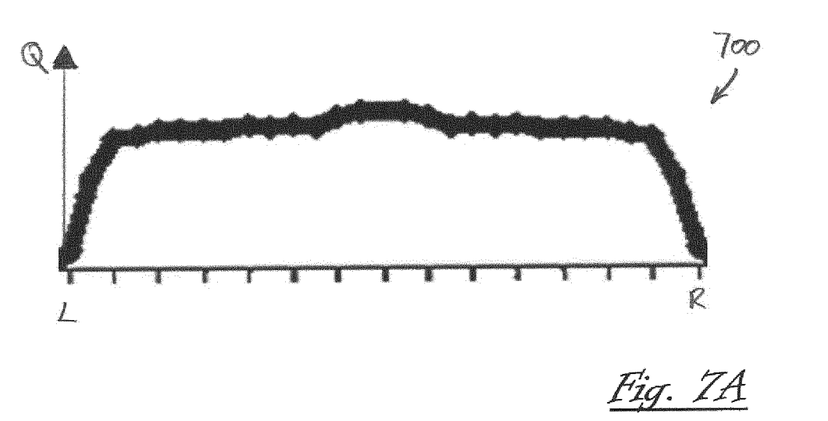
FIG. 7A shows a schematic representation of a feeding load across the width of a chopper in a high MOG harvesting condition.
Figure 7B:
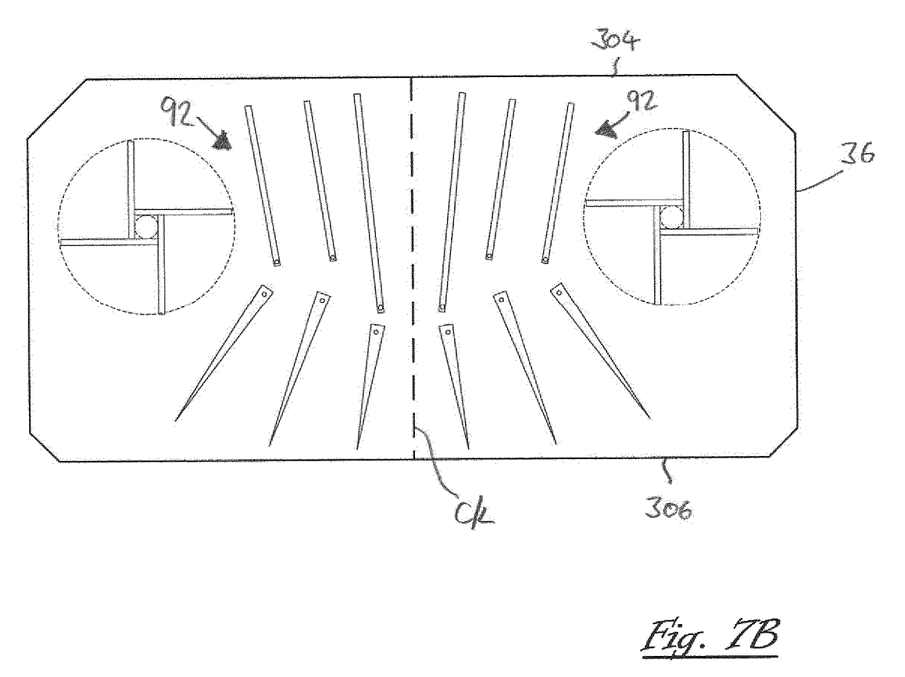
FIG. 7B shows a schematic plan view of the residue spreader of FIG. 4, showing as example positioning of the inlet deflectors in the high MOG harvesting condition.

FIG. 7A illustrates a plot 700 of the rate of residue material 'Q' discharged by the rotors 28 across the width of the discharge chute 34 in a high MOG harvesting condition. As can be seen, in a high MOG harvesting condition, the material is more spread out across the full width of the chopper inlet 204. When a high MOG harvesting condition is detected the inlet deflectors 92 are, in one embodiment, positioned so as to steer residue material inwardly towards the centre line (C/L) as illustrated in FIG. 7B.

Figure 8A:
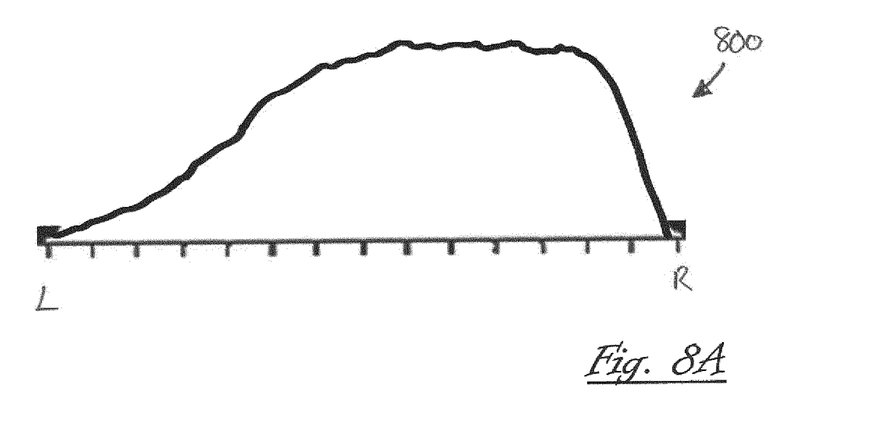
FIG. 8A shows a schematic representation of a feeding load across the width of a chopper in a sidehill harvesting condition.
Figure 8B:
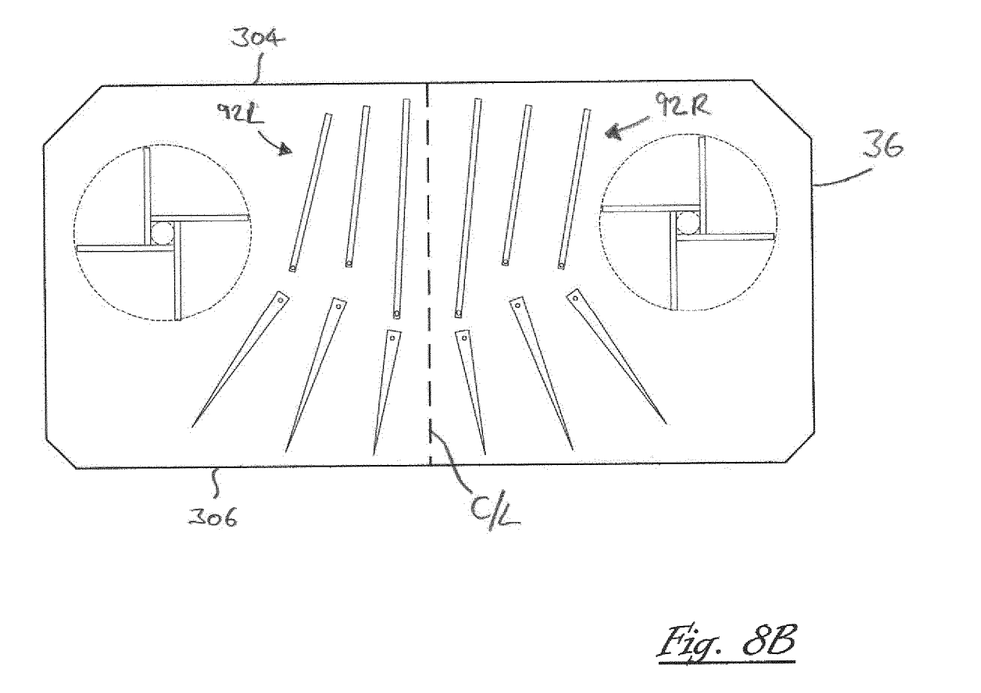
FIG. 8B shows a schematic plan view of the residue spreader of FIG. 4, showing as example positioning of the inlet deflectors in the sidehill MOG harvesting condition.

FIG. 8A illustrates a plot 800 of the rate of residue material 'Q' discharged by the rotors 28 across the width of the discharge chute 34 in a sidehill harvesting condition wherein the right-hand side of the combine 10 is leaning downhill. As can be seen, in a sidehill harvesting condition, the material 'bunches' towards the downhill side, thus feeding the chopper 35 unevenly. In known machines, this leads to an uneven spread pattern behind the combine with material distributed more heavily on the downhill side. When a sidehill harvesting condition is detected the inlet deflectors 92 are, in one embodiment of the invention, positioned so as to steer residue to the uphill side as illustrated in FIG. 8B thus improving the evenness of the spread pattern.

In another example, the inlet deflectors 92 may be controlled so as to counter the effects of a sidewind, wherein the deflectors 92 are positioned so as to steer more residue material to the upwind side.

Figure 9:
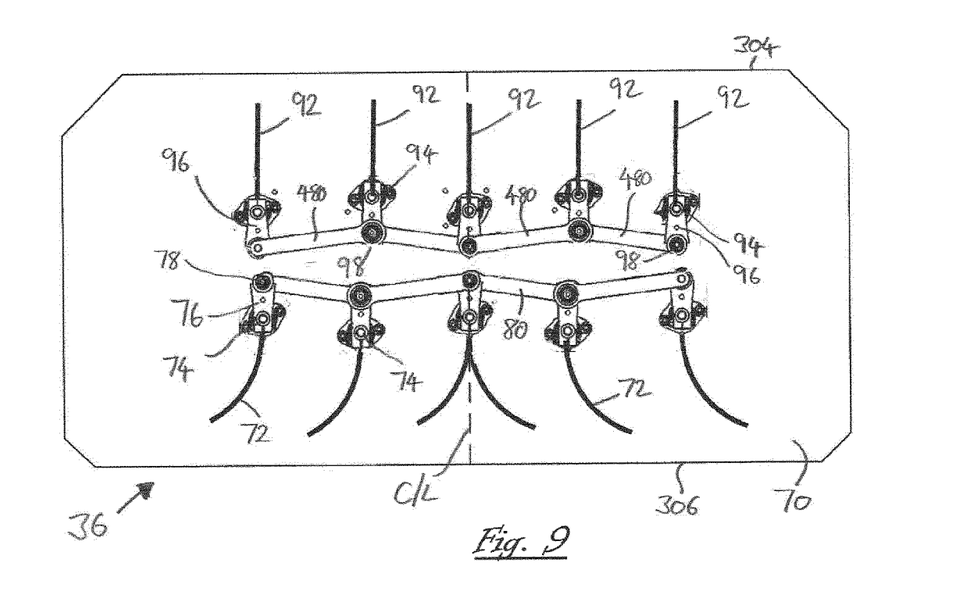
FIG. 9 shows a plan view of an arrangement of a straw spreader tailboard having inlet and outlet deflector plates driven by respective sets of an embodiment of actuator mechanism.

Another embodiment is shown in FIG. 9. Attached to each of the output deflectors 72 at its pivoting connection 74 is a respective crank arm 76 extending generally in the opposite direction to the respective deflector plate. At the distal (free) end of each crank arm 76 is a respective pivotal connection 78. Moving one of these pivotal connections 78 to the left or right causes the connected deflector plate 72 to swing to the right or left about the respective pivoting connection 74. Adjacent pairs of pivotal connections 78 are joined by respective link arms 80 such that at least adjacent pairs of deflector plates are coupled to move in unison. In the arrangement of FIG. 9, each crank arm 76 is joined to its neighbour by a link arm 80 and hence all the deflector plates move in unison.

Movement of the crank arms 76 to swing the outlet deflectors 72 may be achieved by a suitable actuator, such as a hydraulic or pneumatic cylinder or an electromechanical servo unit coupled with the crank arm 76 or the shaft on which it is mounted with the deflector plate.

Further options for connection, with the deflectors being arranged into independently operable left and right hand clusters or groups, are described below.

Attached to each of the inlet deflectors 92 at its pivoting connection 94 is a respective crank arm 96 extending generally in the opposite direction to the respective deflector 92. At the distal (free) end of each crank arm 96 is a respective pivotal connection 98. Moving one of these pivotal connections 98 to the left or right causes the connected input deflector 92 to swing to the right or left about the respective pivoting connection 94.

Adjacent pairs of pivotal connections 98 are joined by respective link arms 480 such that at least adjacent pairs of inlet deflectors 92 are coupled to move in unison. In the arrangement of FIG. 9, each crank arm 96 is joined to its neighbour by a link arm 480 and hence all the inlet deflectors 92 move in unison.

As for the inlet deflectors 92, movement of the crank arms 96 to swing the inlet deflectors 92 may be achieved by a suitable actuator, such as a hydraulic or pneumatic cylinder or an electromechanical servo unit coupled with the link arm 96 or the shaft on which it is mounted with the deflector plate.

In a preferred arrangement, the configuration of crank arms 76, 96, link arms 80, 480, and coupled actuator mechanism is replicated between the inlet and outlet deflector arrays to reduce the count of different components. In effect, the first and second arrays (adjustment mechanisms) may be mounted to the tailboard body in back-to-back arrangement, with one mechanism rotated by 180 degrees with respect to the other.

The crank arms 76, 96, link arms 80, 480 and associated connections to actuators may be conveniently arranged on the top surface of the base plate 70, wherein the deflectors 72, 92 are coupled thereto through the base plate 70 by the pivotal connections 78, 98.

Figure 10:
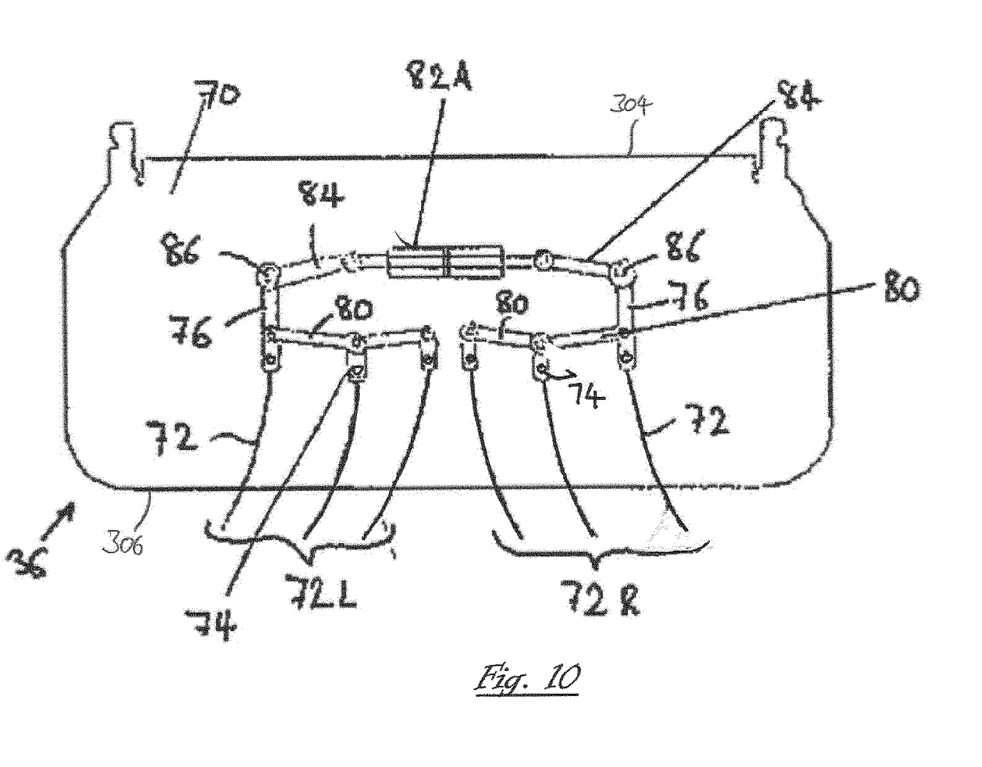
FIGS. 10 and 11 show a plan view of an arrangement of a straw spreader tailboard in accordance with further embodiments of actuator mechanism; and, FIG. 12 is a schematic plan view of a residue spreader in accordance with an embodiment showing the control actuators and linkages in association with the deflectors.
Figure 11:
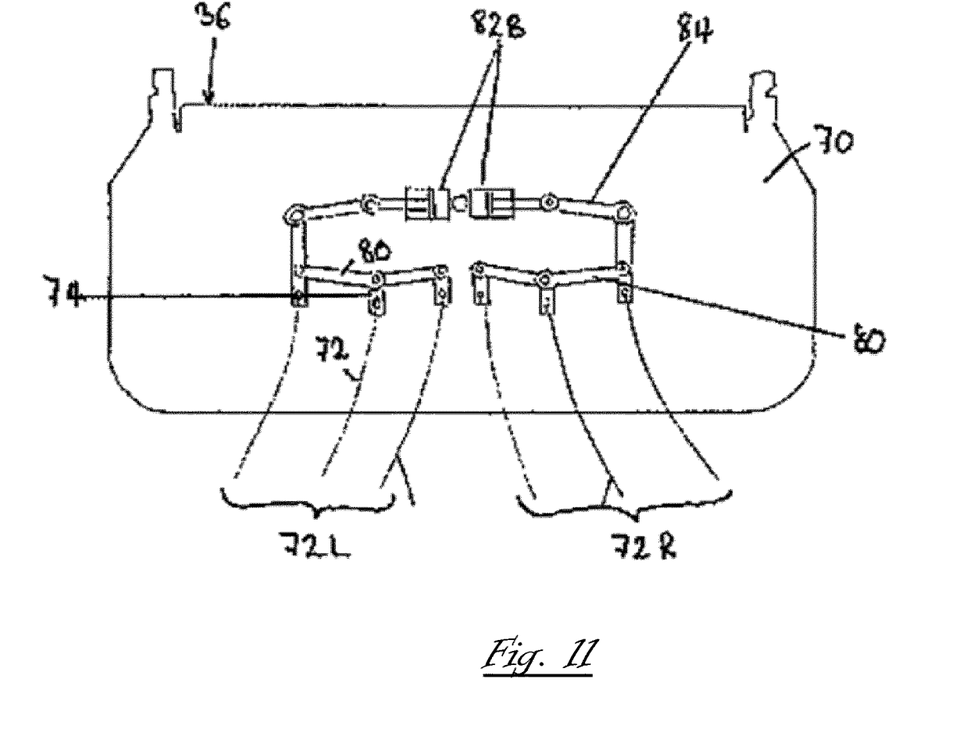

FIGS. 10 and 11 show plan views of the arrangement of parts of the residue spreader according to alternative embodiments of the invention. It should be noted that in these embodiments, the actuator and linkage arrangements for only the outlet deflectors 72 are shown on the understanding that these arrangements may also be used (rotated by 180 degrees as necessary) to drive the motion of the inlet deflectors 92.

As shown in FIGS. 10 and 11, the outlet deflectors 72 are pivotally connected to the base plate 70 with respective pivotal connections 74 in a juxtaposed relationship. FIG. 10 shows a double ended hydraulic cylinder 82A and FIG. 11 shows a pair of single ended cylinders 82B for use as the actuator 82.

The deflectors 72 are divided into two groups (indicated generally by reference numerals 72L, 72R) with three deflector plates present in each group.

The actuator 82A, 82B of the respective embodiments operates to move a pair of linking pivot arms 84 to adjust the group of deflector plates transversely to the base plate 70. Each of the linking pivot arms 84 is coupled at a first end to the actuator 82A; 82B (and moved thereby) and at a second end 86 to an extension of a proximate one of the crank arms 76. The movement of the linking pivot arms 84 also results in the movement of the pivotably connected link arms 80 which are attached to the crank arms 76 which are in turn attached to the deflector plates 72.

In this arrangement, the actuator 82A; 82B can operably move the group of deflector plates 72L, 72R to one side or the other of the tailboard to distribute the crop residue to either the left or right hand side to compensate for side winds.

Figure 12:
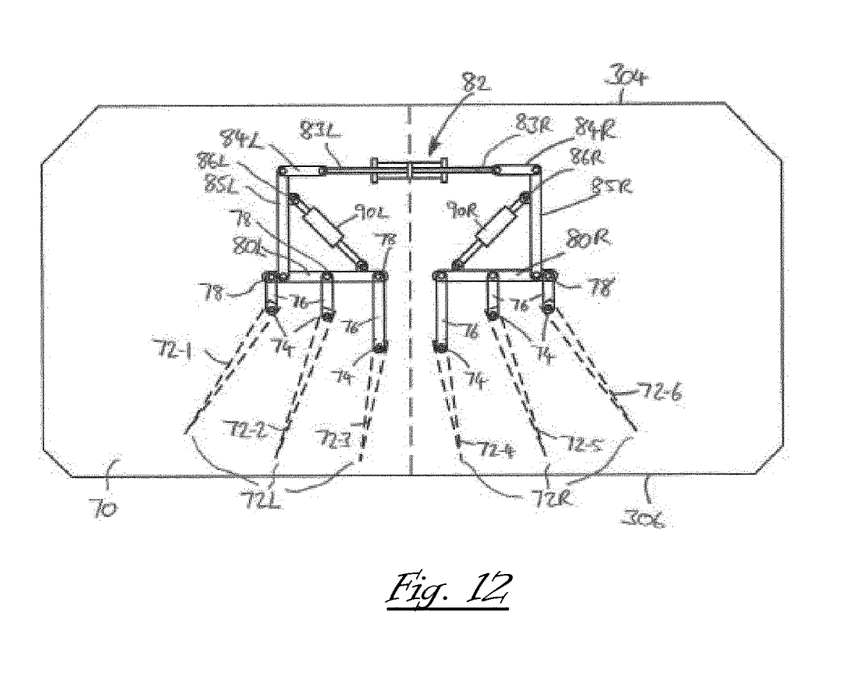

Turning to FIG. 12, a residue spreader in accordance with an embodiment is shown, wherein only outlet deflectors 72 are included, shown as having a straight profile and mounted under the body 70. Attached to each of the outlet (or output) deflectors 72 at its pivoting connection 74 is a respective crank arm 76 extending generally in the opposite direction to the respective deflector 72. The pivoting connections 74 may include a vertical pin passing through the body 70 and retained in position with suitable bearings and fastenings. The deflectors 72 and crank arms 76 pivot together and so, in one embodiment, may be keyed to the respective pin passing through the pivoting connection 74 so as to rotate therewith.

The crank arm 76 and linkage described hereinafter is conveniently mounted above the body 70 so as to keep it separate from the flow of residue material.

The distal (free) end of each crank arm 76 in each group is connected to a connection element 80 or crossbar at respective pivotal connections 78. The connection elements 80 serve to couple together the deflectors 72 within the associated group so that they move together in unison. Moving one of these connection elements 80 to the left or right causes the connected deflectors 72 to swing to the right or left about the respective pivoting connection 74.

Although shown as a common component, the connection element 80 may comprise a plurality of link arms each connecting two or more deflectors 72 together to effect coupled movement.

Movement of the crank arms 76 to swing the outlet deflectors 72 may be achieved by a distribution actuator 82, which is shown in FIG. 12 as a double-ended hydraulic cylinder. A first piston rod 83L of the distribution actuator 82 is connected to the connection element 80L of the left-hand group of deflectors 72L by a first link arm 84L and a second link arm 85L. A second piston rod 83R of the distribution actuator 82 is connected to the connection element 80R of the right-hand group of deflectors 72R by a first link arm 84R and a second link arm 85R. In both cases, the first link 84 is pivotally connected at one end to the distribution actuator 82 and at a second end to a first end of the second link 85. The second link 85 is pivotally connected at a second end to the respective connection element 80 at a position away from any of the pivotal connections 78.

For the linkage mechanisms of both sides, the second link 85 is triangulated with the connection element 80 by a linear adjustment actuator 90. In more detail, a first end of left-hand adjustment actuator 90L is connected to the left-hand second link 85L at a pivot connection 86L intermediate the pivotal connections with the left-hand first link 84L and the left-hand connection element 80L. A second end of the left-hand adjustment actuator 90L is connected to the left-hand connection element 80L. A first end of right-hand adjustment actuator 90R is connected to the right-hand second link 85R at a pivot connection 86R intermediate the pivotal connections with the right-hand first link 84R and the right-hand connection element 80R. A second end of the right-hand adjustment actuator 90R is connected to the right-hand connection element 80R.

Extension and retraction of the adjustment actuators 90L, 90R changes the angle between the associated second link 85 and the connection element 80 thereby adjusting the position of the deflectors of that group only.

Although shown as a double-ended hydraulic cylinder, it should be understood that any practical actuator that can move first links 83 to the left and right can be used, such as an orbital motor or wobble box with a crank connected to the first links 84.

During operation the distribution actuator 82 is operable to control movement of both the left and right groups of deflectors in common. In one mode of operation the distribution actuator 82 may be controlled to oscillate left and right causing all deflectors to repeatedly swing left and right in order to deliver an even spread distribution across the spread width. In addition, the adjustment actuators 90L, 90R can be adjusted for increasing, decreasing or offsetting the spread width.

For example, if both adjustment actuators 90L, 90R are extended, the spread width will become wider. If both adjustment actuators 90L, 90R are retracted, the spread width will become narrower. If left-hand adjustment actuator 90L is extended and right-hand actuator 90R is retracted, the spread will be offset to the left. If right-hand adjustment actuator 90R is extended and left-hand actuator 90L is retracted, the spread will be offset to the right.

In another embodiment there is disclosed a tailboard 36 for a combine harvester or similar for spreading chopped material received from the harvester. The tailboard 36 has a body 70 and an inlet and an outlet. The tailboard 36 has a first set of deflector plates 72 as output deflector plates pivotally mounted on the body 70 and extending generally backwards. The output deflector plates 72 are adjustable in a transverse direction of the tailboard by means of a first adjusting mechanism comprising a respective connection element 76 connected to each of the deflector plates 72 of the output set of deflector plates and an actuator connected with at least one connection element. The tailboard further comprises a further set of deflector plates 92 as input deflector plates pivotally mounted on the body 70 extending generally forwards towards the inlet. The input deflector plates 92 are also adjustable in a transverse direction of the tailboard 36 by means of a second adjusting mechanism comprising a respective connection element 96 connected to each of the deflector plates 92 of the input set of deflector plates and an actuator connected with at least one connection element.

In summary there is provided a residue spreader for receiving crop residue from a residue chopper of a combine harvester and for spreading crop residue onto the ground. The spreader includes a generally planar body having an inlet side and an outlet side. A plurality of outlet deflectors are provided, each outlet deflector being mounted on said body in juxtaposed position and configured to laterally deflect the crop residue between the inlet side and the outlet side. A plurality of inlet deflectors are provided, each inlet deflector being pivotally mounted on said body in juxtaposed position and extending forwards from a respective pivot axis towards said inlet side and each being configured to laterally deflect the crop residue between the inlet side and the outlet side upstream of the outlet deflectors.

All references cited herein are incorporated herein in their entireties. If there is a conflict between definitions herein and in an incorporated reference, the definition herein shall control.

Clearly the skilled person will recognise that various aspects, embodiments and elements of the present application, including as illustrated in the figures, may be arranged in differing combinations, any and all of which may be considered to fall within the ambit of the inventive concept. The invention will be defined by the following claims.

The invention claimed is:

1. A residue spreader for receiving crop residue from a residue chopper of a combine harvester and for spreading crop residue onto the ground, the spreader comprising:
   a body having an inlet side and an outlet side;
   a plurality of outlet deflectors, each outlet deflector being mounted on the body in juxtaposed position and configured to laterally deflect the crop residue between the inlet side and the outlet side, wherein each outlet deflector is pivotally mounted on the body; and
   a plurality of inlet deflectors, each inlet deflector being pivotally mounted on the body in juxtaposed position and extending forwards from a respective pivot axis towards the inlet side and each being configured to laterally deflect the crop residue between the inlet side and the outlet side upstream of the outlet deflectors;
   an outlet deflector control actuator coupled to the plurality of outlet deflectors to operably adjust the outlet deflectors.

2. The residue spreader of claim 1, further comprising an inlet deflector control actuator coupled to the plurality of inlet deflectors to operably adjust the inlet deflectors.

3. The residue spreader of claim 2, further comprising an inlet deflector adjusting mechanism comprising a respective connection element connected to each of the plurality of inlet deflectors and the inlet deflector control actuator connected with at least one of the connection elements of the respective connection elements connected to the plurality of inlet deflectors.

4. The residue spreader of claim 1, wherein each outlet deflector extends rearwards from a respective pivot axis.

5. The residue spreader of claim 1, further comprising an outlet deflector adjusting mechanism comprising a respective connection element connected to each of the plurality of outlet deflectors and the outlet deflector control actuator connected with at least one of the connection elements.

6. The residue spreader of claim 1, wherein the plurality of outlet deflectors comprises the same number of deflectors as the plurality of inlet deflectors.

7. The residue spreader of claim 6, wherein the respective pivotal mountings of each of the inlet deflectors are aligned with pivotal mountings of the outlet deflectors in a fore and aft direction between the inlet side and the outlet side.

8. A residue spreader, for receiving crop residue from a residue chopper of a combine harvester and for spreading crop residue onto the ground, the spreader comprising:
a body having an inlet side and an outlet side;
a plurality of outlet deflectors, each outlet deflector being mounted on the body in juxtaposed position and configured to laterally deflect the crop residue between the inlet side and the outlet side;
a plurality of inlet deflectors, each inlet deflector being pivotally mounted on the body in juxtaposed position and extending forwards from a respective pivot axis towards the inlet side and each being configured to laterally deflect the crop residue between the inlet side and the outlet side upstream of the outlet deflectors;
an inlet deflector adjusting mechanism comprising a respective connection element connected to each of the plurality of inlet deflectors and the inlet deflector control actuator connected with at least one of the connection elements; and
an outlet deflector adjusting mechanism comprising a respective connection element connected to each of the plurality of outlet deflectors and the outlet deflector control actuator connected with at least one of the connection elements, wherein the components of the inlet deflector adjusting mechanism are identical to the components of the outlet deflector adjusting mechanism.

9. The residue spreader of claim 1, wherein the body is generally planar and each of the outlet deflectors extends substantially vertically downwards and has a generally curved profile in a plane parallel to the body.

10. The residue spreader of claim 1, wherein the body is generally planar and each of the inlet deflectors extends substantially vertically downwards and has a generally planar profile in a plane perpendicular to the body.

11. The residue spreader of claim 1, wherein the deflectors of at least one of the pluralities of inlet deflectors and outlet deflectors are divided into at least two groups, wherein the deflectors within each group are connected together by a linkage mechanism, and wherein a pivot arm is pivotably connected at one end to the linkage mechanism and pivotably connected at the other end to an actuator which operably moves said end in a lateral direction to the body.

12. The residue spreader of claim 11, wherein each group of deflectors comprises at least three deflectors.

13. The residue spreader of claim 1, further comprising a pair of impellors journaled to the body on respective upright rotation axes and positioned outboard of the inlet deflectors.

14. The residue spreading system comprising The residue spreader of claim 1, and a controller configured to control pivoting movement of the inlet deflectors.

15. The residue spreading system of claim 14, wherein the movement of the inlet deflectors is controlled in dependence upon a sensed feeding state.

16. A combine harvester comprising the straw chopper and the residue spreader of claim 1, the residue spreader being mounted immediately downstream of the straw chopper.

17. The combine harvester of claim 16, further comprising two axial-flow separating rotors each configured to convey a crop material stream in a generally helical and rearward path and deposit the crop stream above and into the straw chopper.

18. The residue spreader of claim 8, wherein the body is generally planar and each of the outlet deflectors extends substantially vertically downwards and has a generally curved profile in a plane parallel to the body.

19. The residue spreader of claim 8, wherein the body is generally planar and each of the inlet deflectors extends substantially vertically downwards and has a generally planar profile in a plane perpendicular to the body.

* * * * *